United States Patent [19]

Hyeon

[11] Patent Number: 5,341,173
[45] Date of Patent: Aug. 23, 1994

[54] AUTOMATIC GAIN CONTROL CIRCUIT

[75] Inventor: Yun-Jong Hyeon, Ihcheonjikhal, Rep. of Korea

[73] Assignee: SamSung Electronics Co., Ltd., Kyungki-do, Rep. of Korea

[21] Appl. No.: 934,218

[22] Filed: Aug. 25, 1992

[30] Foreign Application Priority Data

Apr. 22, 1992 [KR] Rep. of Korea ............... 1992-6726

[51] Int. Cl.⁵ ............................................... H04N 5/52
[52] U.S. Cl. ................................. 348/525; 348/679; 348/682
[58] Field of Search ............ 375/98; 455/234.1, 241.1, 455/245.2; 358/174, 179, 175, 176, 178, 177; H04N 5/52, 5/53, 5/54

[56] References Cited

U.S. PATENT DOCUMENTS 4,658,297 4/1987 Nomura et al. .
4,667,242 5/1987 Hagino .

FOREIGN PATENT DOCUMENTS 57-84690 5/1982 Japan .
0145484 9/1982 Japan .............................. H04N 5/52
0015477 1/1986 Japan .............................. H04N 5/52
0015478 1/1986 Japan .............................. H04N 5/52

Primary Examiner—Victor R. Kostak
Assistant Examiner—Nathan J. Flynn
Attorney, Agent, or Firm—Robert E. Bushnell

[57] ABSTRACT

An automatic gain control circuit includes a first amplifier for receiving a video signal to produce a first signal with a gain varied in response to a control signal, a low-pass filter for removing a color component from the first signals to produce a second signal, a sync separator for separating synchronizing pulses from the second signal to produce a third signal, a delay circuit for delaying the third signal for a given time to produce a fourth signal, a clamper for clamping the second signal upon a constant reference voltage generated from a constant voltage generator 26, a sample and hold circuit 26 for receiving the fourth signal and a fifth signal to produce a sixth signal maintaining for a given time a level of a back porch of the fifth signal, a transconductance amplifier for comparing the sixth signal with a constant reference voltage to produce a difference signal as a seventh signal, a capacitor for integrating the seventh signals to produce a direct current error voltage as an eighth signal, and a second amplifier for receiving the eighth signal to produce a ninth signal applied to the first amplifier.

18 Claims, 4 Drawing Sheets

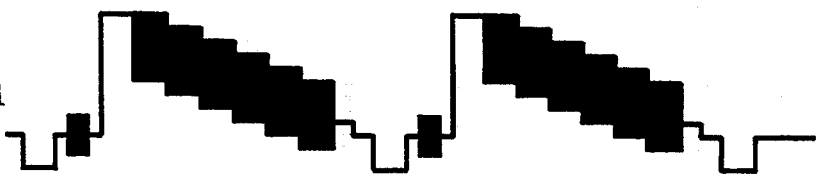
FIG. 4A
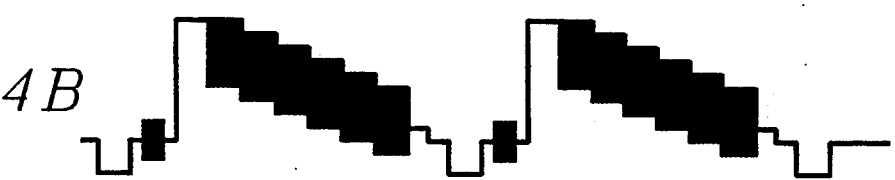
FIG. 4B
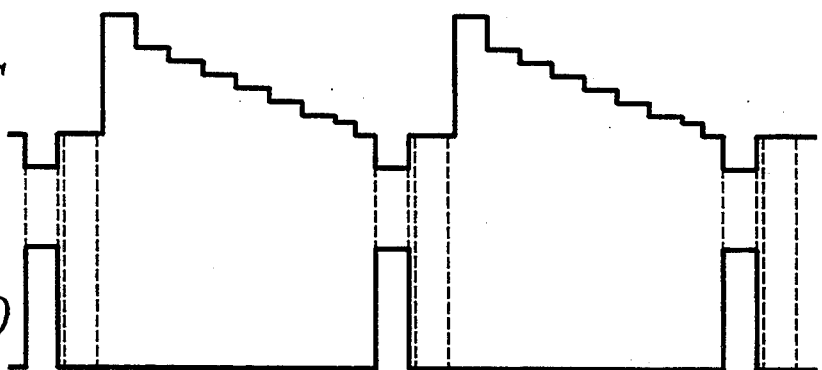
FIG. 4C
FIG. 4D
FIG. 4E
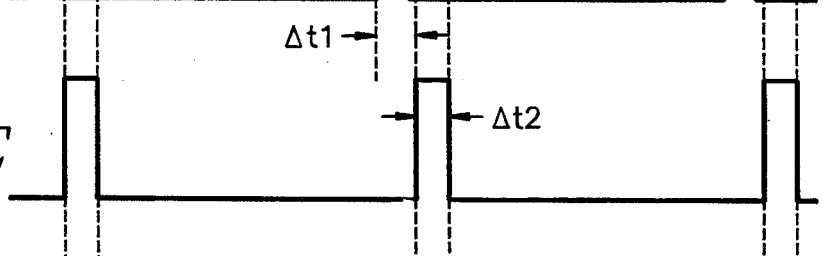
FIG. 4F
FIG. 4G
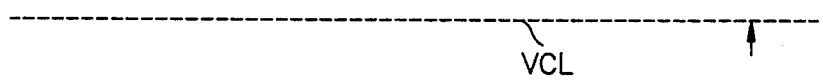

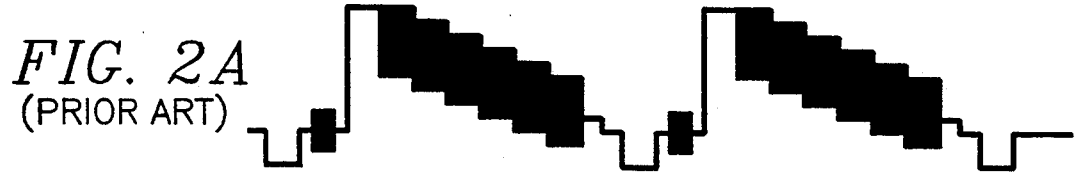
FIG. 2A
(PRIOR ART)
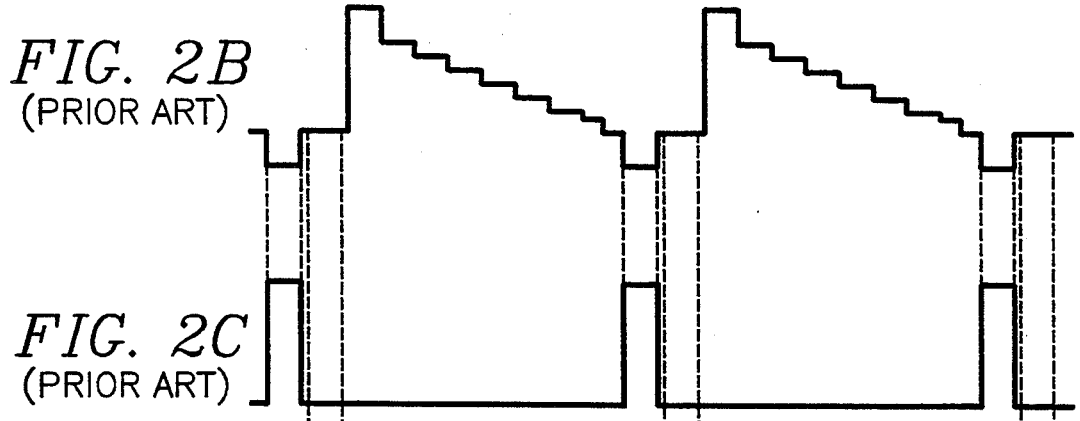
FIG. 2B
(PRIOR ART)
FIG. 2C
(PRIOR ART)
FIG. 2D
(PRIOR ART)
FIG. 2E
(PRIOR ART)
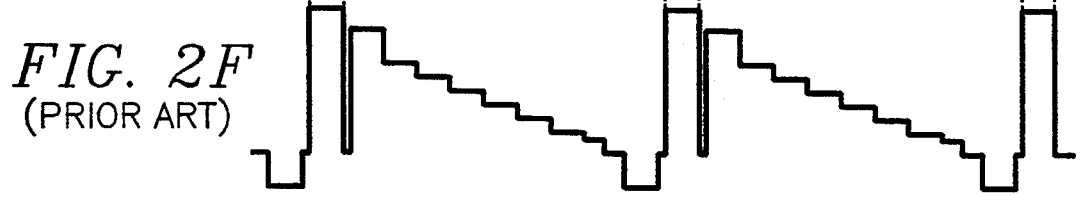
FIG. 2F
(PRIOR ART)

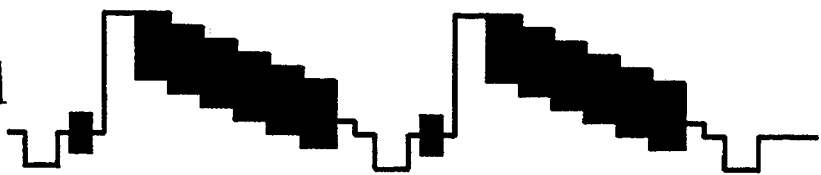
FIG. 4A
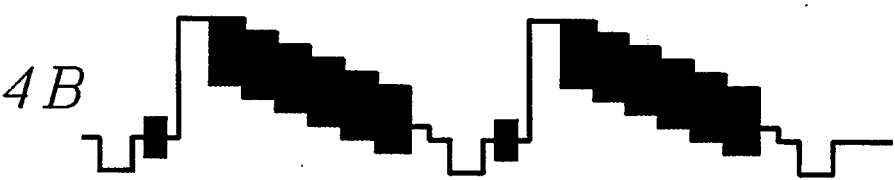
FIG. 4B
FIG. 4C
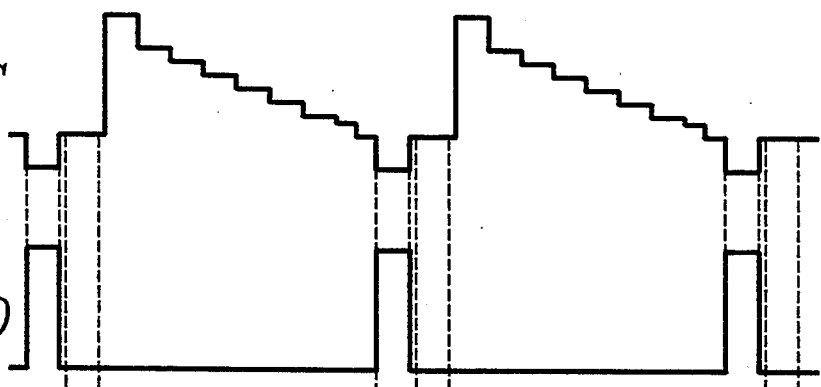
FIG. 4D
FIG. 4E
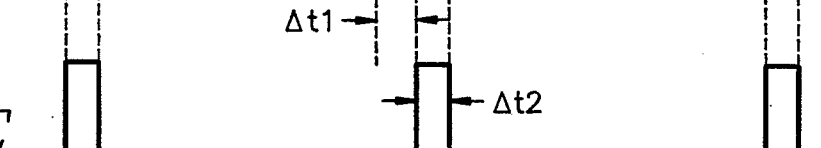
FIG. 4F
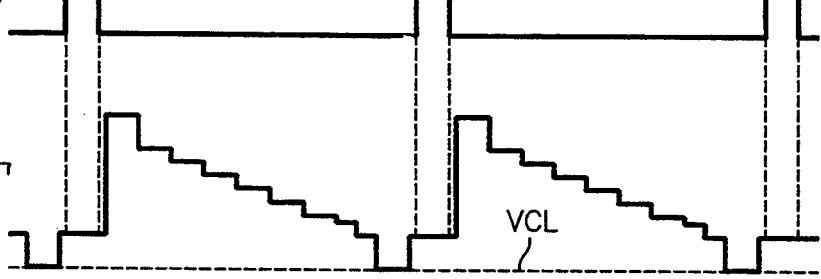
FIG. 4G
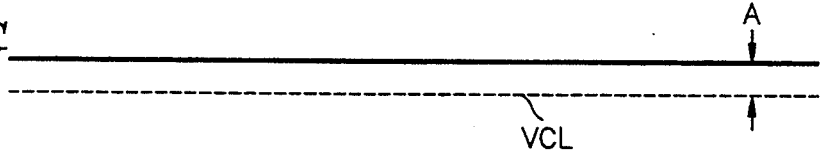

AUTOMATIC GAIN CONTROL CIRCUIT

BACKGROUND OF THE INVENTION

The present invention relates to a video signal processing system, and more particularly an automatic gain control circuit (AGC) thereof.

Generally an automatic gain control circuit controls input video signals at a given specified level in an image signal processing system such as a video tape recorder (VTR). Namely, it compares the amplitude of the synchronizing signal with a reference voltage to control the amplitude of the luminance signal at a reference value.

A conventional automatic gain control circuit, as shown in FIG. 1, comprises a first amplifier 1 with a gain varied according to a control voltage, a low-pass filter 2 for eliminating color signals, a sync separator 3 for separating synchronizing pulses, a delay circuit 4 for delaying the pulse from the sync separator 3, a clamper 5 for clamping the output of the low-pass filter 2, a first integrating circuit 6 for integrating the combined outputs from the delay circuit 4 and the clamper 5, a comparator 8 for comparing the output of the first integrating circuit 6 with a reference voltage adjusted by a variable resistor 7 to produce an error voltage, a second integrating circuit 9 for integrating the error voltage, and a second amplifier 10 for receiving the error voltage.

FIGS. 2A to 2F show the signal waveforms according to the automatic gain control circuit of FIG. 1, wherein FIG. 2A represents the input signal waveform to the automatic gain control circuit, FIG. 2B the output waveform of the low-pass filter 2, FIG. 2C the output waveform of the sync separator 3, FIG. 2D the output waveform of the delay circuit, FIG. 2E the output waveform of the clamper, and FIG. 2F the combined waveform of FIGS. D and E.

In this conventional automatic gain control circuit, the first amplifier 1 receives the video signals containing color signals of FIG. 2A. The low-pass filter 2 eliminates the undesired color video signals from the output signals of the first amplifier 1.

The sync separator 3 separates the synchronizing pulses from the output signal of the low-pass filter 2. And thereafter the output signal is delayed by the delay circuit 4 for a given time. The output signal in FIG. 2D is combined with the output signal in FIG. 2E of the clamper 5 in the mixer 11. The output signal in FIG. 2F of the mixer is transformed into a direct current voltage by the first integrating circuit 6, then compared with the reference voltage adjusted by the variable resistor 7 in the comparator 8. Thus the difference signal between the direct current voltage of the first integrating circuit 6 and the reference voltage is produced with a voltage gain. The output of the comparator 8 is received by the second integrating circuit 9 to produce an error voltage fed back via the second amplifier 10 to the first amplifier 1, thus controlling the voltage gain to obtain the desired video signals.

As stated above, this conventional circuit requires a variable resistor that should be manually adjusted in order to obtain the specified output value, making it difficult to automate a production line, thus increasing the production cost. Moreover the output waveform of FIG. 2F is integrated by the first integrating circuit 6, and therefore the output level of the circuit is changed according to the content of the video signals.

SUMMARY OF THE INVENTION

It is an object of the present invention to provide an automatic gain control circuit that makes it easy to automate the production line to reduce production cost.

It is another object of the present invention to provide an automatic gain control circuit with a constant output level regardless of the content of the input video signals.

According to one aspect of the present invention, an automatic gain control circuit is provided with a constant voltage source instead of a variable resistor.

According to another aspect of the present invention, an automatic gain control circuit includes a first amplifier for receiving video signals to produce first signals with a gain varied in response to a control signal; a low-pass filter for removing the color video signal from the first signals to produce second signals; a sync separator for separating synchronizing pulses from the second signals to produce third signals; a delay circuit for delaying the third signals for a given time to produce fourth signals; a clamper for clamping the second signals upon a constant reference voltage generated from a constant voltage generator; a sample and hold circuit for receiving the fourth and fifth signals to produce sixth signals maintaining for a given time the level of the back porch of the fifth signals; a transconductance amplifier for comparing the sixth signals with the constant reference voltage to produce a difference signal between them as seventh signals; a capacitor for integrating the seventh signals to produce a direct current error voltage as eighth signals; and a second amplifier for receiving the eighth signals to produce ninth signals applied to the first amplifier.

BRIEF DESCRIPTION OF THE ATTACHED DRAWINGS

For a better understanding of the invention, and to show how the same may be carried into effect, reference will now be made, by way of example, to the accompanying diagrammatic drawings, in which:

FIG. 1 is a block diagram of a conventional automatic gain control circuit;

FIGS. 2A–2F shows the signal waveforms of FIG. 1;

FIGS. 4A–4G shows the signal waveforms of FIG. 3.

DETAILED DESCRIPTION OF A PREFERRED EMBODIMENT

Figure 3:
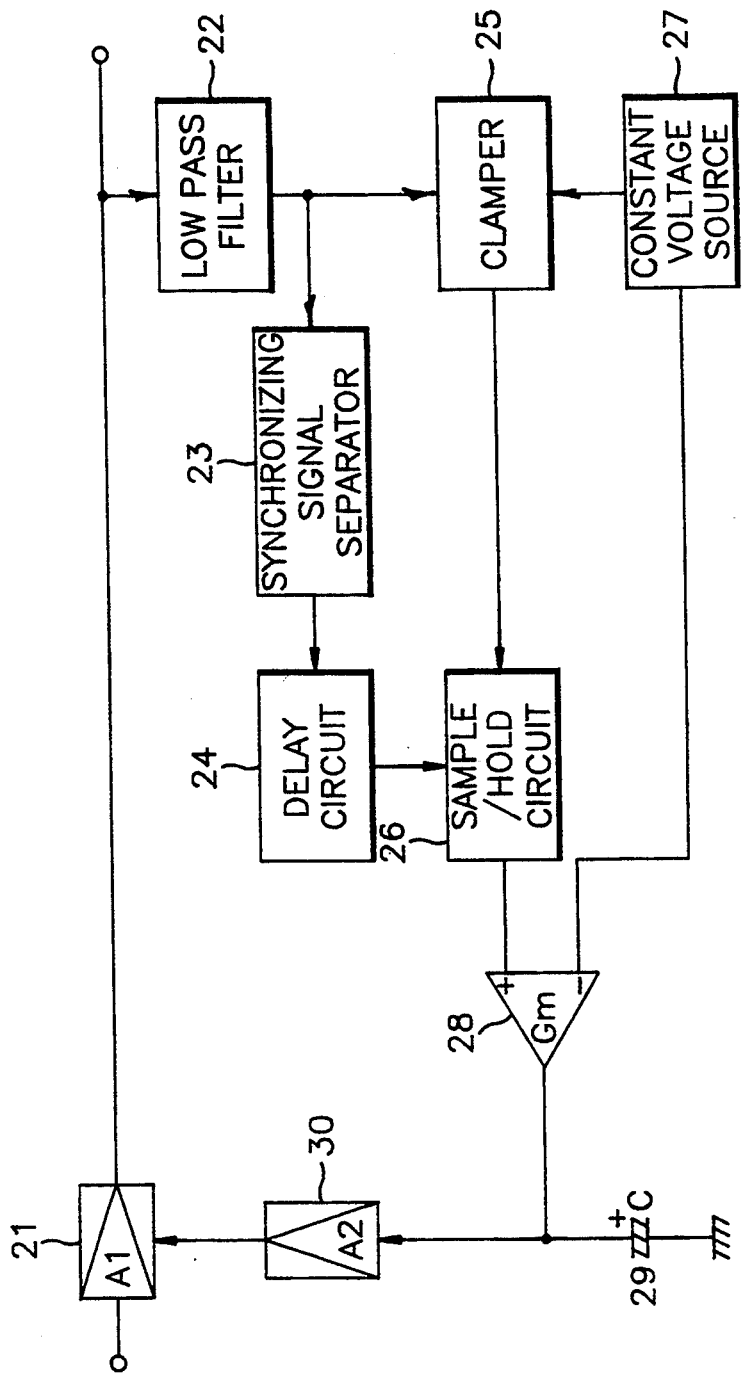
FIG. 3 is a block diagram of an automatic gain control circuit according to an embodiment of the present invention.

Referring to FIG. 3, a first amplifier 21 has a gain varied in response to a control voltage. A low-pass filter 22 removes the color video signal from the output signals of the first amplifier 21. A sync separator 23 separates synchronizing pulses from the output video signals of the low-pass filter. A delay circuit 24 delays the synchronizing pulses for a given time to provide sampling pulses to a sample and hold circuit in the back porch of the video signals. A clamper 25 clamps the output signals of the low-pass filter upon a constant reference voltage VCL generated from a constant voltage generator 27. The sample and hold circuit 26 receives the output signals of the clamper 25 to take the back porch whose level is maintained for a given time. A transconductance amplifier 28 compares the output signals of the sample and hold circuit 26 with the constant reference voltage to produce the difference signal between them as a current. A capacitor 29 integrates the output signals of the transconductance amplifier to produce a direct current error voltage. A second amplifier 30 adjusts the feedback gain. The constant voltage generator 27 provides the clamper 25 and the transconductance amplifier 28 with the reference voltage.

FIGS. 4A to 4G show the signal waveforms according to the automatic gain control circuit of FIG. 3, wherein FIG. 4A represents the input waveform of the inventive automatic gain control circuit, FIG. 4B the output waveform of the first amplifier, FIG. 4C the output waveform of the low-pass filter, FIG. 4D the output waveform of the sync separator, FIG. 4E the output waveform of the delay circuit 24, FIG. 4F the output waveform of the clamper 25, and FIG. 4G the output waveform of the sample and hold circuit 26.

In operation, the video signals of 1Vpp (peak to peak) including the color signals such as pulse the waveform of FIG. 4A generally comes to a waveform with an initial voltage gain B as shown in FIG. 4B through the first amplifier 21. Here, following processes are performed in order to detect the gain B. The low-pass filter 22 removes the undesired color video signals from the output signals of the first amplifier 21 to produce the waveform of FIG. 4C. The sync separator 23 separates the synchronizing pulses from the output signals of the low-pass filter 22, which synchronizing pulses are delayed by the delay circuit 24 for a given time $\Delta t$, to provide the pulse of FIG. 4E. Meanwhile, the output signals of the low-pass filter 22 are clamped upon the reference clamp voltage VCL in the clamper 25.

The output signals of the delay circuit 24 and the clamper 25 are applied to the sample and hold circuit 26, which samples the synchronizing value of the output signals of the clamper 25 for $\Delta t$ by using the output signals of the delay circuit as the sampling pulses, and maintains the sampled voltage level until generation of the next pulse. Accordingly, the synchronizing value A is detected at the output waveform of the sample and hold circuit 26, as shown in FIG. 4G. Thus the specified signals of about 1Vpp are produced, as shown in FIG. 4B. If the two input signals of the transconductance amplifier 28 have the same level, i.e., the output signals of the sample and hold circuit 26 have the desired level, the output of the transconductance amplifier becomes 0V so that the control voltage applied to the second amplifier 30 is not changed causing the output signals as shown in FIG. 4B to maintain a constant level and zero gain B. On the other hand, if the level of the reference voltage from the constant voltage source 27 is greater than the output level of the sample and hold circuit 26. i.e., the level of the output signals of the sample and hold circuit 26 is lower than the desired level, the charges stored in the capacitor 29 are discharged to reduce the error voltage, thus increasing the gain B of the first amplifier 21. Assuming that the output voltage of the sample and hold circuit is $V_{SH}$ and the reference voltage $V_{REF}$, the output voltage $V_O$ of the amplifier 28 may be expressed by Eq. (1).

$$V_O = Cm(V_{SH} - V_{REF})/SC \tag{1}$$

Wherein Gm represents the gain of the transconductance, S a Laplate constant, and C is capacitance. It will be noted from Eq. (1) that the difference between the synchronizing level of the output signals of FIG. 4B and the reference voltage ($V_{SH} - V_{REF}$) is integrated.

As stated above, the inventive automatic gain control circuit employs the constant voltage generator and the sample and hold circuit, instead of the conventional variable resistor and integrating circuit, to obtain a constant output level regardless of the level of the input video signals. Furthermore, the output level is automatically adjusted to the desired value, and therefore it is possible to automate the production line to reduce production costs.

While the invention has been particularly shown and described with reference to the preferred specific embodiment thereof, it will be apparent to those skilled in the art that changes in form and detail may be made without departing from the spirit and scope of the present invention.

What is claimed is:

1. An automatic gain control circuit, comprising:
   first amplifier means for receiving video signals to produce first signals with a gain varied in response to control signals;
   low-pass filter means for removing color components from said first signals to produce second signals;
   sync separator means for separating synchronizing pulses from said second signals to produce third signals;
   delay circuit means for delaying said third signals for a predetermined time to produce fourth signals;
   clamper means for clamping said second signals upon a constant reference voltage generated from constant voltage generator means to produce fifth signals;
   sample and hold circuit means for sampling and holding said fifth signal in dependence upon said fourth signals to produce sixth signals;
   transconductance amplifier means for providing difference signal in dependence upon comparison of said sixth signals with said constant reference voltage to produce difference signal as seventh signals;
   means for integrating said seventh signals to produce direct current error voltages as eighth signals; and
   second amplifier means for receiving said eighth signals to produce ninth signals applied to said first amplifier means as said control signals to control the gain of said first signals.

2. An automatic gain control circuit of a video signal processing system, said circuit comprising:
   video signal amplifying means for producing an amplified video signal by amplifying a video signal in dependence upon an automatic gain control signal;
   means for providing a luminance component of the amplified video signal by removing a chrominance component from the amplified video signal;
   means for providing a constant reference voltage;
   means for providing a clamped signal by clamping the luminance component with the constant reference voltage;
   means for generating a synchronizing value by separating synchronizing pulses from the luminance component, providing sampling pulses by delaying the synchronizing pulses by a first predetermined time, sampling the clamped signal with the sampling pulses, and holding the sampled clamped signal for a second predetermined time; and
   means for generating the automatic gain control signal by comparing the synchronizing value with the constant reference voltage.

3. The automatic gain control circuit of claim 2, wherein said means for providing a luminance signal is a low-pass filter.

4. The automatic gain control circuit of claim 2, wherein said means for generating a synchronizing value comprises:
- a synchronizing signal separator for providing the synchronizing pulses by separating said synchronizing pulses from said luminance component;
- a delay circuit for providing the sampling pulses in a back porch of the video signal by delaying the synchronizing pulses; and
- a sample-and-hold circuit for providing the synchronizing value in response to the clamped signal and the sampling pulses.

5. The automatic gain control circuit of claim 2, wherein said means for generating the automatic gain control signal comprises:
- a transconductance amplifier having a first terminal coupled to receive the synchronizing value, a second terminal coupled to receive the constant reference voltage, for producing an error current by detecting a difference between the synchronizing value and the constant reference voltage;
- a voltage amplifier producing the automatic gain control signal by amplifying a direct current error voltage; and
- a capacitor interposed between said transconductance amplifier, said voltage amplifier and a reference potential, for producing said direct current error voltage by integrating the error current.

6. A method of producing an automatic gain control signal in a video processing system, comprising the steps of:
- amplifying a video signal in response to the automatic gain control signal;
- generating a luminance component of the amplified video signal by removing a chrominance component from the amplified video signal;
- generating a constant reference voltage;
- generating a clamped signal by clamping the luminance component with the constant reference voltage;
- producing a sampling pulse in response to the luminance component;
- generating a synchronizing value by sampling pulse; and
- producing an automatic gain control signal by comparing said synchronizing value with said constant reference voltage.

7. The method of claim 6, wherein said luminance component is generated by low-pass filtering of the amplified video signal.

8. The method of claim 6, where said step of producing said sampling pulse comprises the steps of:
- separating a synchronizing pulse from the luminance component; and
- delaying the synchronizing pulse by a predetermined time.

9. The method of claim 6, wherein said step of producing said automatic gain control signal comprises the steps of:
- producing an error current by comparing said synchronizing value with said constant reference voltage;
- producing a direct current error voltage by integrating said error current; and
- producing said automatic gain control signal by amplifying said direct current error voltage.

10. A method of generating an automatic gain control signal in a video processing system, comprising the steps of:
- amplifying a video signal in response to the automatic gain control signal;
- generating a luminance component of the amplified video signal by removing a chrominance component from the amplified video signal;
- generating a constant reference voltage;
- generating a clamped signal by clamping the luminance component with the constant reference voltage;
- obtaining a synchronizing component from the luminance component;
- delaying the synchronizing component for a delay period to produce a delayed signal;
- producing a sample-and-hold signal by sampling and holding said clamped signal with said delayed signal;
- producing an error current by comparing said sample-and-hold signal with said constant reference voltage;
- providing a direct current error voltage by integrating said error current; and
- producing said automatic gain control signal by amplifying said direct current error voltage.

11. An automatic gain control circuit comprising:
- amplifying means for producing an amplified signal by amplifying an input signal in response to an automatic gain control signal;
- means for providing a constant reference voltage;
- means for providing a clamped signal by clamping the amplified signal with the constant reference voltage;
- means for generating a synchronizing value by separating synchronizing pulses from the amplified signal, providing sampling pulses by delaying the synchronizing pulses by a first predetermined time, sampling the clamped signal with the sampling pulses, and holding the sampled clamped signal for a second predetermined time, said synchronizing value generating means comprising:
  - a synchronizing signal separator for providing the synchronizing pulses by separating said synchronizing pulses from said amplified signal;
  - a delay circuit for providing the sampling pulses in a back porch of the amplified signal by delaying the synchronizing pulses; and
  - a sample-and-hold circuit for providing the synchronizing value in response to the clamped signal and the sampling pulses; and
- means for generating the automatic gain control signal by comparing the synchronizing value with the constant reference voltage.

12. An automatic gain control circuit comprising:
- amplifying means for producing an amplified signal by amplifying an video input signal in response to an automatic gain control signal;
- filter means for providing filtered signal by low-pass filtering said amplified signal;
- clamper means for providing a clamped signal by clamping the filter signal with a reference voltage;
- means for generating a synchronizing value by separating synchronizing pulses from the filtered signal, providing sampling pulses by delaying the synchronizing pulses by a first period, sampling the clamped signal with the sampling pulses, and holding the sampled clamped signal for a second period, said means for generating said synchronizing value comprising:

a synchronizing signal separator for providing the synchronizing pulses by separating said synchronizing pulses from said filtered signal;

a delay circuit for providing the sampling pulses in the filtered signal by delaying the synchronizing pulses; and a sample and hold circuit for providing the synchronizing value in response to the clamped signal and the sampling pulses; and means for generating the automatic gain control signal by comparing the synchronizing value with the constant reference voltage.

13. The automatic gain control circuit of claim 11, wherein said means for generating the automatic gain control signal comprises:

a transconductance amplifier having a first terminal coupled to receive the synchronizing value, a second terminal coupled to receive the constant reference voltage, for producing an error current by detecting a difference between the synchronizing value and the constant reference voltage;

a voltage amplifier for producing the automatic gain control signal by amplifying a direct current error voltage; and a capacitor interposed between said transconductance amplifier, said voltage amplifier and a reference potential, for producing said direct current error voltage by integrating the error current.

14. A method of generating an automatic gain control signal, comprising the steps of:

amplifying an input signal in response to an automatic gain control signal;

generating a constant reference voltage;

clamping the amplified signal with the constant reference voltage;

generating a synchronizing value by separating synchronizing pulses from the amplified signal, providing sampling pulses by delaying the synchronizing pulses by a first predetermined time, sampling the clamped signal with the sampling pulses, and holding the sampled clamped signal for a second predetermined time, said synchronizing value generating step comprising the steps of:

providing the synchronizing pulses by separating said synchronizing pulses from said amplified signal;

providing the sampling pulses in a back porch of the amplified signal by delaying the synchronizing pulses; and providing the synchronizing value from a sample-and-hold circuit in response to the clamped signal and the sampling pulses; and generating the automatic gain control signal by comparing the synchronizing value with the constant reference voltage.

15. A method of generating an automatic gain control signal, comprising the steps of:

amplifying an input video signal in response to an automatic gain control signal;

clamping the amplified signal with a reference voltage;

generating a synchronizing value by separating synchronizing pulses from the amplified signal, providing sampling pulses by delaying the synchronizing pulses by a first predetermined time, sampling the clamped signal with the sampling pulses, and holding the sampled clamped signal for a second predetermined time, said step of generating said synchronizing value comprising:

providing the synchronizing pulses by separating said synchronizing pulses from said amplified signal;

providing the sampling pulses in the amplified signal by delaying the synchronizing pulses; and providing the synchronizing value from a sample-and-hold circuit in response to the clamped signal and the sampling pulses; and generating the automatic gain control signal by comparing the synchronizing value with the constant reference voltage.

16. The method of claim 14, wherein said step of generating the automatic gain control signal comprises:

producing an error current by detecting a different between synchronizing value and the constant reference voltage;

producing a direct current error voltage by integrating the error current; and producing the automatic gain control signal by amplifying said direct current error voltage.

17. The automatic gain control circuit as claimed in claim 12, wherein said means for generating the automatic gain control signal comprises:

a transconductance amplifier producing an error current by detecting a difference between the synchronizing value and the constant reference voltage;

a capacitor producing a direct current error voltage by integrating the error current; and a voltage amplifier producing the automatic gain control signal by amplifying the direct current error voltage.

18. The method of claim 15, wherein said step of generating the automatic gain control signal comprises:

producing an error current by detecting a difference between the synchronizing value and the reference voltage;

producing a direct current error voltage by integrating the error current; and producing the automatic gain control signal by amplifying the direct current error voltage.

* * * * *

UNITED STATES PATENT AND TRADEMARK OFFICE
CERTIFICATE OF CORRECTION

PATENT NO. : 5,341,173
DATED : 23 August 1994
INVENTOR(S) : Yun- Jong Hyeon

It is certified that error appears in the above-indentified patent and that said Letters Patent is hereby corrected as shown below:

On the title page:

Abstract [57], Line 5   after "first" change "signals" to --signal--;

Line 11 after "generator" delete "26";

Line 12 before "for" delete "26";

Line 18 after "seventh" change "signals" to --signal--;

Column 2, Line 7    after "production" (2$^{nd}$ occurrence) change "cost" to --costs--;

Column 3, Line 21   after "generally" change "comes" to --come--;

Line 67    before "constant" change "Laplate" to --Laplace--;

UNITED STATES PATENT AND TRADEMARK OFFICE
CERTIFICATE OF CORRECTION

PATENT NO. : 5,341,173
DATED : 23 August 1994
INVENTOR(S) : Yun- Jong Hyeon

It is certified that error appears in the above-indentified patent and that said Letters Patent is hereby corrected as shown below:

Column 5, Line 47    after "by" insert --sampling and holding the clamped signal in accordane with the--;

Column 6, Line 58    before "means" change "amplifying" to --amplifier--:

Signed and Sealed this

Twenty-second Day of October, 1996

*Attest:*

BRUCE LEHMAN

*Attesting Officer*     *Commissioner of Patents and Trademarks*